United States Patent
Endo et al.

(10) Patent No.: US 10,090,106 B2
(45) Date of Patent: Oct. 2, 2018

(54) LAMINATED CERAMIC ELECTRONIC COMPONENT

(71) Applicant: TDK Corporation, Tokyo (JP)

(72) Inventors: Makoto Endo, Tokyo (JP); Keisuke Ishida, Tokyo (JP); Koichi Yamaguchi, Tokyo (JP); Shimpei Tanabe, Tokyo (JP)

(73) Assignee: TDK CORPORATION, Tokyo (JP)

( * ) Notice: Subject to any disclaimer, the term of this patent is extended or adjusted under 35 U.S.C. 154(b) by 113 days.

(21) Appl. No.: 15/009,250

(22) Filed: Jan. 28, 2016

(65) Prior Publication Data
US 2016/0225526 A1    Aug. 4, 2016

(30) Foreign Application Priority Data

Feb. 2, 2015    (JP) .................. 2015-018628

(51) Int. Cl.
| | |
|---|---|
| H01G 4/30 | (2006.01) |
| H01G 4/12 | (2006.01) |
| H01G 4/06 | (2006.01) |
| H01G 4/005 | (2006.01) |
| H01G 4/228 | (2006.01) |
| H01G 4/232 | (2006.01) |

(52) U.S. Cl.
CPC ............. *H01G 4/12* (2013.01); *H01G 4/1227* (2013.01); *H01G 4/232* (2013.01); *H01G 4/30* (2013.01)

(58) Field of Classification Search
CPC .......... H01G 4/30; H01G 4/232; H01G 4/012; H01G 4/12; H01G 4/228; H01G 4/306
USPC .................. 361/301.4, 321.2, 321.1, 303
See application file for complete search history.

(56) References Cited

U.S. PATENT DOCUMENTS

| | | | |
|---|---|---|---|
| 2001/0013388 A1 | 8/2001 | Miyazaki et al. | |
| 2013/0002388 A1* | 1/2013 | Kim | H01G 4/30 336/200 |
| 2015/0027764 A1* | 1/2015 | Lee | H01G 4/30 174/260 |

FOREIGN PATENT DOCUMENTS

| | | |
|---|---|---|
| JP | 2000-173852 A | 6/2000 |
| JP | 2001-217135 A | 8/2001 |

\* cited by examiner

*Primary Examiner* — Eric Thomas
*Assistant Examiner* — Arun Ramaswamy
(74) *Attorney, Agent, or Firm* — Oliff PLC (57) ABSTRACT

A laminated ceramic electronic component with a cuboid-shaped element main body having a first main face and a second main face elongating along the length direction and the width direction, a first side face and a second side face elongating along the length direction and the height direction, and a first end face and a second end face elongating along the width direction and the height direction; and a pair of internal electrode layers opposite to each other in the height direction inside the element main body with a dielectric layer interposed therebetween in such a manner that they are exposed at the first end face or the second end face, wherein the thickness of the dielectric layer becomes larger from central portion to the first side face and the second side face.

6 Claims, 8 Drawing Sheets

LAMINATED CERAMIC ELECTRONIC COMPONENT

The present invention relates to a laminated ceramic electronic component such as a laminated ceramic capacitor.

BACKGROUND

The laminated ceramic capacitor is highly required to have a small size and a large capacity, and the dielectric layer is being prepared into thin multi-layers. However, if the dielectric layer becomes thin, the insulation resistance is likely to deteriorate and the reliability also tends to deteriorate due to the increased intensity of the electrical field applied to the dielectric layer. Further, as the mechanical strength of the dielectric layer decreases, an additional problem appears that the thermal shock resistance will deteriorate. In Patent Document 1, the deterioration in reliability is prevented by decreasing the thickness deviation of the dielectric layer. In Patent Document 2, the failure caused by the concentration of the electrical field is prevented from happening at the end part by doubling the thickness of the dielectric layer close to the outmost layer or thickening its thickness to an even higher level.

Patent Document

Patent Document 1: JP-A-2001-217135
Patent Document 2: JP-A-2000-173852

SUMMARY

In the method described in Patent Document 1, as the concentration of the electrical field generated around the end part of the internal electrode layer cannot be avoided, the insulation resistance cannot be sufficiently prevented from deteriorating. In addition, the technical problem related to the thermal shock resistance has not been described.

In the method described in the Patent Document 2, the deterioration of the insulation resistance due to the concentration of electrical field can be inhibited at the end part. However, since the dielectric layer becomes thicker, the component comes into a larger size. Further, the technical problem concerning thermal shock resistance has not been described, either.

In view of the actual conditions mentioned above, the present invention aims to provide a laminated ceramic electronic component, it has excellent reliability and thermal shock resistance even if the dielectric layer is thin.

In order to solve the technical problems mentioned above, the laminated ceramic electronic component of the present invention is characterized in that it is provided with a cuboid-shaped element main body and a pair of internal electrode layers, wherein the element main body has a first main face and a second main face elongating along the length direction and the width direction, a first side face and a second side face elongating along the length direction and the height direction, and a first end face and a second end face elongating along the width direction and the height direction, the internal electrode layers are opposite to each other in the height direction inside the ceramic element body with a dielectric layer interposed therebetween in such a manner that they are exposed at the first end face or the second end face, and the thickness of the dielectric layer becomes larger from the central portion towards the first side face and the second side face.

With the dielectric layer interposed between the end portions of the internal electrode layers thickened, the concentration of the electrical field is alleviated and the reliability can be improved.

In addition, if the thickness at the central portion of the dielectric layer is defined as $d_1$ and the thickness at the end portion of the dielectric layer close to the first side face or the second side face is defined as $d_2$, the ratio of $d_2$ to $d_1$ ($d_2/d_1$) gradually gets larger from the outmost layer towards the central region in the laminating direction.

With respect to the end portion of the dielectric layer that does not connected directly with the external electrode, the heat release becomes lower at the part closer to the central region in the laminating direction. Thus, the insulation resistance is likely to deteriorate because of the high temperature caused by the concentration of electrical field. However, with such a heat release distribution, the central region in the laminating direction where the deterioration is likely to occur is improved preferentially, leading to a further improved reliability.

Additionally, in the central region in the laminating direction, the ratio of $d_2$ to $d_1$ ($d_2/d_1$) is preferably 1.15 to 1.30, wherein the $d_1$ is the thickness at the central portion of the dielectric layer and the $d_2$ is the thickness at the end portion of the electric layer close to the first side face or the second side face.

If $d_2/d_1$ is controlled at the range mentioned above, the failure due to the application of an electrical field with a high intensity to the relatively thin central portion of the dielectric as well as the failure happened at the end portion can be inhibited, resulting in improved reliability.

Further, the thickness of the internal electrode layer preferably gets thinner from the central portion towards the first and the second side faces.

In the connection boundary portion between the side face portion and the internal layer portion where the internal electrode layer and the dielectric layer are laminated, as the difference of thermal expansion coefficients is decreased between the side face portion and the internal layer portion, cracks due to the thermal shock can be prevented from appearing.

In addition, when the thickness at the central portion of the internal electrode layer is defined as $e_1$ and the thickness at the end portion of the internal electrode layer close to the first side face and the second side face is defined as $e_2$, the relationship of $0.9 \leq (d_2+e_2)/(d_1+e_1) \leq 1.0$ is satisfied with the thickness $d_1$ at the central portion of one of the dielectric layers and the thickness $d_2$ at the end portion of one of the dielectric layers close to the first side face or the second side plan. Thereby, the thermal shock resistance can be further improved.

According to the present invention, a laminated ceramic electronic component such as a laminated ceramic capacitor can be provided with excellent reliability and thermal shock resistance even it possesses a thin dielectric layer.

DETAILED DESCRIPTION OF EMBODIMENTS

Hereinafter, the preferable embodiments of the present invention will be described with reference to the drawings. However, the present invention is not limited to the following embodiments. In addition, the same symbol is provided to the same component with repeated descriptions omitted. Further, the drawings are exemplary that the size ratio among components and the shape of each component may be different from those of the real objects.

<Laminated Ceramic Electronic Component (Laminated Ceramic Capacitor)>

Figure 1:
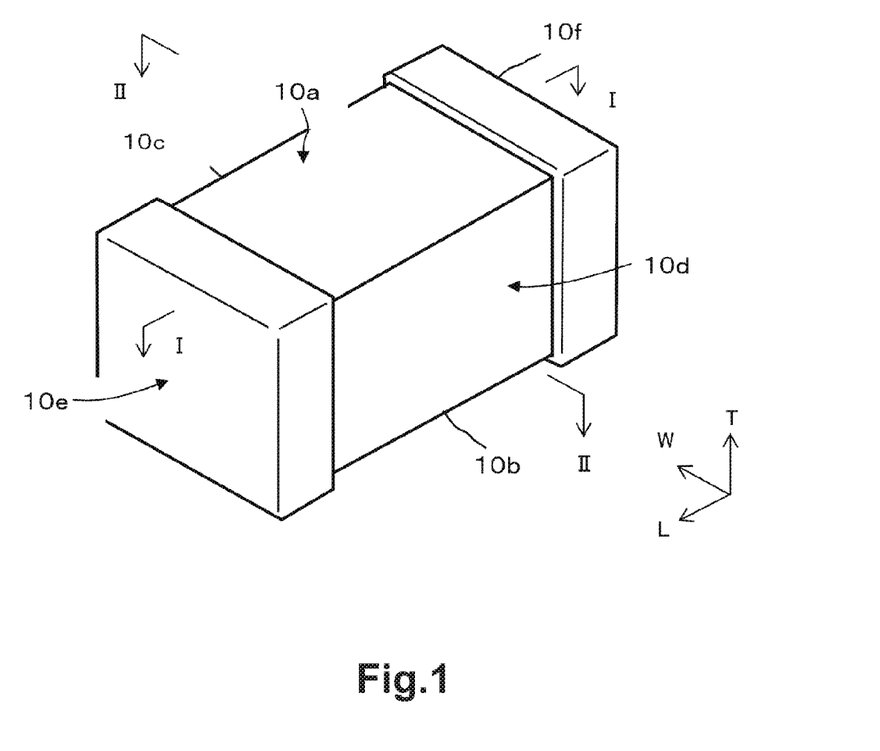
FIG. 1 is a schematic perspective view showing a laminated ceramic capacitor according to an example of the present invention.
Figure 2:
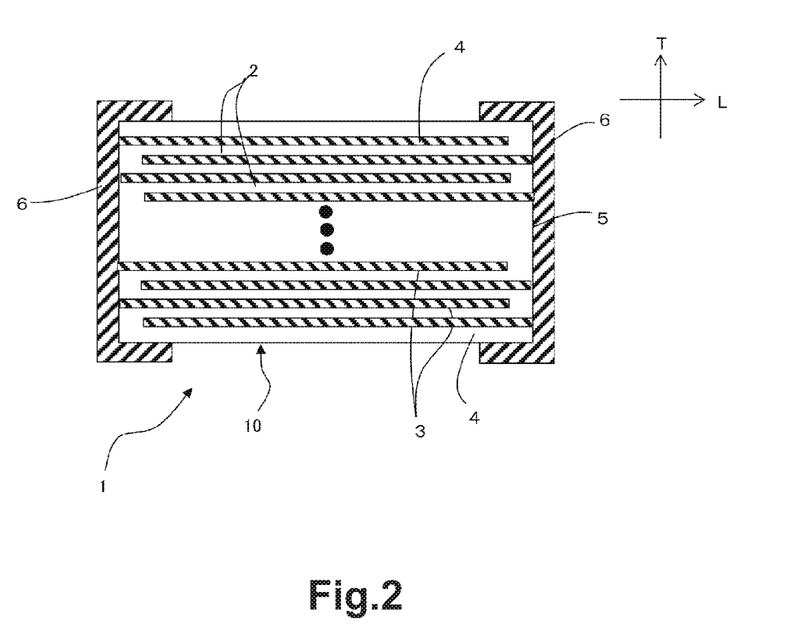
FIG. 2 is a schematic sectional view of the laminated ceramic capacitor as shown in FIG. 1 along the I-I line.
Figure 3:
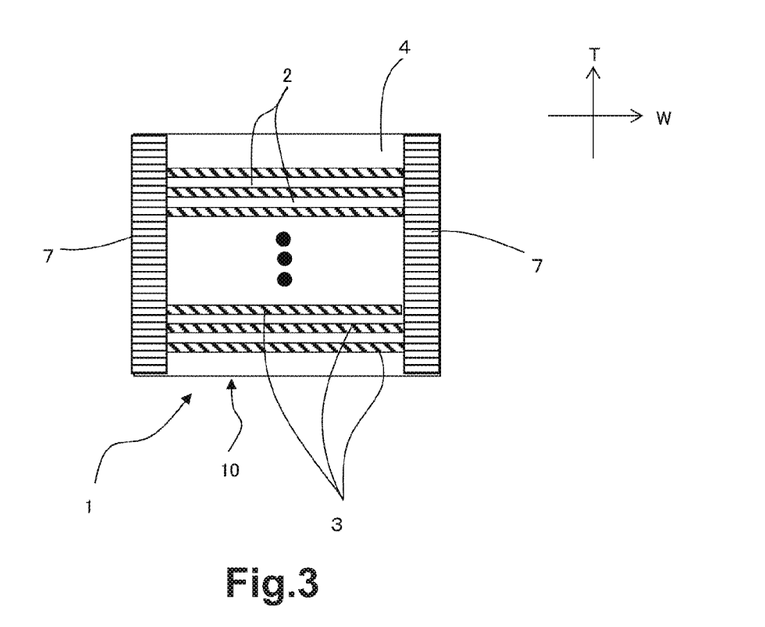
FIG. 3 is a schematic sectional view of the laminated ceramic capacitor as shown in FIG. 1 along the II-II line.

FIG. 1, FIG. 2 and FIG. 3 show the perspective view and schematic sectional views of a laminated ceramic capacitor regarded as one embodiment of the laminated ceramic electronic component of the present invention.

FIG. 1 is a perspective view of a laminated ceramic capacitor 1 according to one embodiment of the present invention (Example 1). An element main body 10 is formed to be cuboid-shaped. The element main body 10 is provided with a first main face 10a, a second main face 10b, a first side face 10c, a second side face 10d, a first end face 10e, and a second end face 10f. The first main plan 10a and the second main face 10b elongate along the length direction L and the width direction W. The first side face 10c and the second side face 10d longate along the length direction L and the height direction T. And the first end face 10e and the second end face 10f elongate along the width direction W and the height direction T.

FIG. 2 is a schematic sectional view of the laminated ceramic capacitor as shown in FIG. 1 along the I-I line. In the laminated ceramic capacitor 1, internal electrode layers 3 are laminated inside the element main body 10 with dielectric layers 2 interposed thereamong, and the outmost portion of the element main body 10 in the laminating direction is formed by an outer layer portion 4. A pair of external electrodes 6 is disposed on the first and the second end faces in such a manner that the two electrodes are interconnected with the internal electrode layers 3 which are exposed at end planes on opposite sides by turns. FIG. 3 is a schematic sectional view of the laminated ceramic capacitor as shown in FIG. 1 along the II-II line. Both end portions of the dielectric layers 2 and the internal electrode layers 3 are composed of the side face portion 7.

The shape of the element main body 10 is not particularly restricted and can be appropriately selected in accordance with the purpose and use. Usually, it is formed as a cuboid. The surface of the element main body 10 can be either concave or convex. The size is not restricted either and can be appropriately selected according to the purpose and use. The size is usually approximately (0.4 to 3.2 mm) in length ×(0.2 to 2.5 mm) in width ×(0.15 to 1.9 mm) in height.

The dielectric layer 2 is composed of a dielectric ceramic composition having $BaTiO_3$, $CaZrO_3$, $(Bi_{0.5}Na_{0.5})TiO_3$, $NaNbO_3$ and the like as the main component.

In the present embodiment, the dielectric particles may contain additive component elements if desired. Further, oxides having Si, B and/or Li can be also contained.

Figure 4:
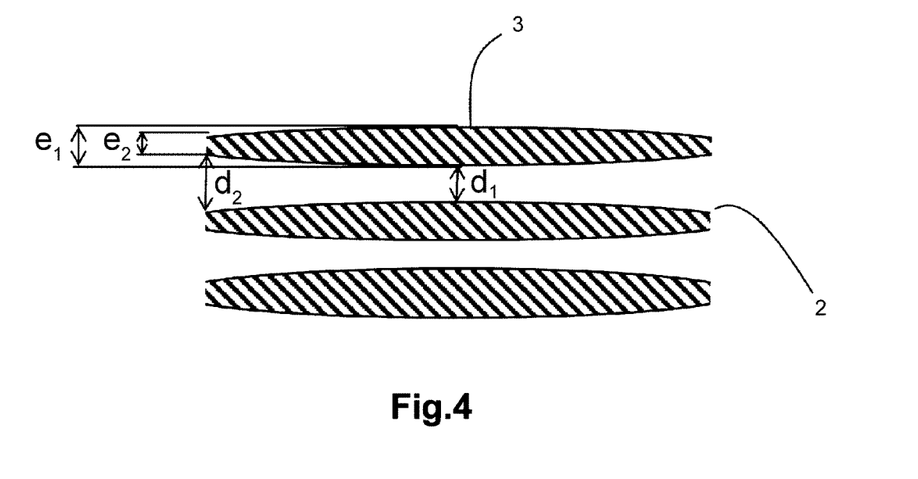
FIG. 4 is an enlarged view of a part of the cross-section as shown in FIG. 3.

FIG. 4 is an enlarged view of a part of the cross-section as shown in FIG. 3. In one embodiment of the present invention, the thickness of the dielectric layer 2 becomes larger from the central portion towards the first side face or the second side face. With respect to the thickness $d_1$ at the central portion of the dielectric layer 2 and the thickness $d_2$ at the end portion close to the first side face and the second side face, the ratio of $d_2$ to $d_1$ ($d_2/d_1$) is 1 or more. The thickness distribution of the dielectric layer 2 from the central portion to the end portion is not particularly restricted. However, the dielectric layer generally becomes thicker as a whole from the central portion to the end portion in despite that the thickness decreases in some segments. In addition, the thickness of the dielectric layer at a 20 µm-long part starting from either end portion is preferably larger than the average thickness of the dielectric layer from one end portion to the other end portion.

The thickness of the dielectric layer can be measured at the cross-section of the element main body 10 by dividing the image using a scanning electron microscope (SEM) with 5000-fold enlarged (25 µm×20 µm for one visual field area). More specifically, the thickness of the dielectric layer 2 is measured at sites with a spacing of 20 µm thereamong in the width direction or the laminating direction.

The $d_1$ is the average thickness at the central portion of several dielectric layers 2, and the $d_2$ is the average thickness at the end portion of several dielectric layers 2 close to the side face portion. If the thickness at the central portion of the dielectric layer 2 which is the layer no. k counting from the outmost layer is defined as $d_{1-k}$ and the thickness at the end portion which is not connected to the external electrode 6 is defined as $d_{2-k}$, it is preferable that $d_{1-k} < d_{2-k}$ when k=1 to n.

The central region in the laminating direction refers to the region containing the layer no. n2 (the layer no. n/2+0.5 when n is an odd number) as the centre and the upper and lower [0.05×n] (⌊ ⌋ represents the Gauss symbol) when a total of n layers of dielectric layers 2 are laminated.

With respect to the thickness ratio of the dielectric layer no. k ($d_{2-k}/d_{1-k}$), it is preferable that the thickness ratio of the dielectric layer at the central region in the laminating direction ($d_{2-n/2}/d_{1-n/2}$) is larger than that at the outmost layer ($d_{2-1}/d_{1-1}$) and ($d_{2-n}/d_{1-n}$). And the thickness ratio is distributed in such a way that it becomes larger from the outmost layer to the central region in the laminating direction. In addition, the distribution is not necessarily to be smooth but the thickness should generally become larger as a whole probably with decrease in some segments. In addition, the thickness ratio of the dielectric layer no. n/2 is not necessarily to be the maximum, and the effect of the present invention can be achieved if the layer with the maximum is present at the central region in the laminating direction.

Further, at the central region in the laminating direction, as for the average thickness $d_1$ at the central portion and the average thickness $d_2$ at the end portion close to the side face portion, ($d_2/d_1$) is preferably 1.15 to 1.30.

The $d_1$ and $d_2$ can he properly determined in accordance with the purpose or the use and are preferably 0.15 to 0.8 µm, more preferably 0.2 to 0.5 µm. The two internal electrode layers 3 with dielectric layers 2 interposed therein can have different lengths, and in this case the distance between the end portion of the internal electrode layer 3 located in the inner side and the other internal electrode with the dielectric layer 2 interposed therein is set to be $d_2$.

The number of the dielectric layers 2 to be laminated can be appropriately determined according to the purpose or the use. It is preferable that 100 layers or more are laminated. More preferably, 200 layers or more are laminated.

The conductive material contained in the internal electrode layer 3 is not particularly restricted and can be, for example, Ni, Cu, Ni—Cu alloy, Ag—Pd alloy or the like.

The thickness of the internal electrode layer 3 can be properly determined in accordance with the purpose or the use. The thickness at the central portion of the internal electrode layer 3 is preferably distributed in such a manner that it turns smaller towards the side face portion 7. The thickness distribution of the internal electrode layer 3 from the central portion to the end portion is not particularly restricted, and the thickness turns smaller from the central portion to the end portion in general in despite of some segments where the thickness becomes larger. The thickness $e_1$ at the central portion of the internal electrode layer 3 and the thickness $e_2$ at the end portion close to the side face portion can be properly determined according to the purpose or the use, They are preferably 0.6 μm or less, and more preferably 0.4 μm or less. The $e_1$ represents the average thickness of several internal electrode layers 3 at the central portion, and $e_2$ represents the average thickness of several internal electrode layers 3 at the end portion close to the side face portion.

The thickness of the dielectric layer 2 and the thickness of the internal electrode layer 3 at the central portion and the end portion preferably meet the following relationship, i.e., $0.9 \leq (d_2+e_2)/(d_1+e_1) \leq 1.0$. Further, when the end region of the internal electrode layer 3 is oxidized, the end portion in the region that is not oxidized is deemed as $e_2$.

The outer layer portion 4 and the side face portion 7 can be composed of a dielectric ceramic composition different from that for the dielectric layer 2. In addition, they can be composed of the glass or resin material. The thicknesses of the outer layer portion 4 and the side face portion 7 can be properly determined according to the purpose or the use, and are preferably 1 μm to 50 μm, further preferably 5 μm to 40 μm and more preferably 2 μm to 20 μm. Also, the outer layer portion 4 and the side face portion 7 can be processed to eliminate the unevenness on the surface due to the distribution of several dielectric layers 2 and internal electrode layers 3 with different thicknesses and lengths.

The conductive material contained in the external electrode 6 is not particularly restricted and can be Ni, Cu or their alloy which are cheap in price. Alternatively, a resin electrode layer composed of a conductive resin with a thermosetting resin and a conductive particle as the main component is disposed on the external electrode 6.

<Method for Producing Laminated Ceramic Capacitor>

Similar to the conventional laminated ceramic capacitor, the laminated ceramic capacitor of the present embodiment can be prepared by making a green chip with using a common printing method or a sheet method where a paste is used, firing the green chip, printing or transferring external electrodes and then performing a sintering process. Hereinafter, the preparation method will be described in detail.

First of all, a dielectric ceramic starting material for forming a dielectric ceramic layer is prepared. The material is then prepared as a paint no as to provide a paste for the dielectric ceramic layer.

With respect to the dielectric ceramic starting material, powders with $BaTiO_3$, $CaZrO_3$, $(Bi_{0.5}Na_{0.5})TiO_3$, $NaNbO_3$, $KNbO_3$ and the like as the main component are prepared. The oxides or the mixture thereof or composite oxides of the components mentioned above can be used as the starting materials. In addition, various compounds turning into the mentioned oxides or composite oxides can be properly selected or can be used in combination. As the compound, for example, the carbonates, the oxalates, the nitrates, the hydroxides, organometallic compounds or the like can be listed.

Further, the dielectric ceramic starting material may be those prepared by various methods, such as those obtained by the so called solid phase method, oxalate related method or various liquid phase methods (for example, the hydrothermal synthesis method, alkoxide method, sol-gel method or the like).

Further, when the dielectric ceramic composition contains components in addition to the main component mentioned above, the starting material for said components can be the oxides or the mixture thereof or composite oxides of these components.

Then, an organic vehicle is mixed in the dielectric ceramic starting material to prepare the paste for the dielectric layer. The organic vehicle is a mixture obtained by dissolving a binder in an organic solvent. The binder is not particularly restricted and can be properly selected from various well-known binders such as ethyl cellulose, polyvinyl butyral and the like. The organic solvent is not particularly restricted and can be appropriately selected from various organic solvents such as dihydroterpineol, butyl carbitol, acetone, toluene or the like according to the printing method or the sheet method.

The paste for the internal electrode layer is prepared by mixing the mentioned organic vehicle and a conductive material composed of a conductive metal or alloy. As the metal used as the conductive material, Ni, Cu, Ni—Cu alloy, Ag—Pd alloy and the like can be used.

Then, the paste for the dielectric layer is prepared as a green chip through the priming method, and then the paste for the internal electrode layer is printed on this green chip so as to form the pattern of the internal electrode layer.

The thus obtained green chips with patterns of internal electrode layer having been printed are laminated in multiple layers. Then, the laminate is cut to provide a cuboid.

The process for forming, the green chip according to one embodiment of the present invention is performed by, for example, applying the paste for the dielectric layer onto the whole side face with the side face stood in a line by using a doctor blade method to provide a region which turns into the side face portion 7 after a firing process. In this way, a green chip is provided. However, the effect of the present invention is based on the structure. Thus, the region which turns to the side face portion 7 also can be formed in the laminating process as long as a method is capable of preparing the structure of the present invention.

Then, a de-binder process is provided to the obtained green chip, wherein the organic component is removed by heating. Next, after the firing process and the annealing process, a element main body 10 is provided.

As the condition in the de-binder process, the temperature rising rate is preferably set as 10 to 300° C./hour. The temperature is preferably kept at 500 to 800° C. for 0.5 to 24 hours. Further, the atmosphere is air or a reductive atmosphere.

In the firing process of one embodiment of the present invention, in order to get a desired thickness distribution in the dielectric layer 2 and the internal electrode layer 3, a special hot press sintering method may be employed in which the temperature distribution and the stress distribution are applied to the interior of the sample in the tiring process by controlling the profiles of the temperature and pressure or selecting a firing tool. However, as the effect of the present invention is based on the structure, various firing methods such as the roller hearth kiln firing, hot isostatic pressing, batch furnace firing or the like can be used together with any dielectric ceramic paste and the internal electrode paste as long as the method can provide the structure of the present invention.

Figure 5:
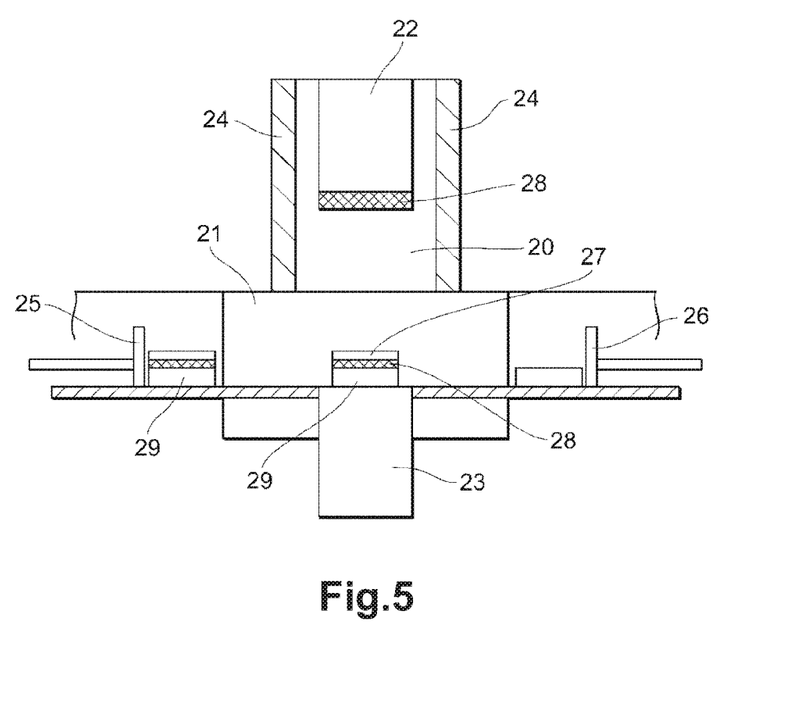
FIG. 5 is a schematic view showing a hot press firing furnace according to one embodiment of the present invention.
Figure 6:
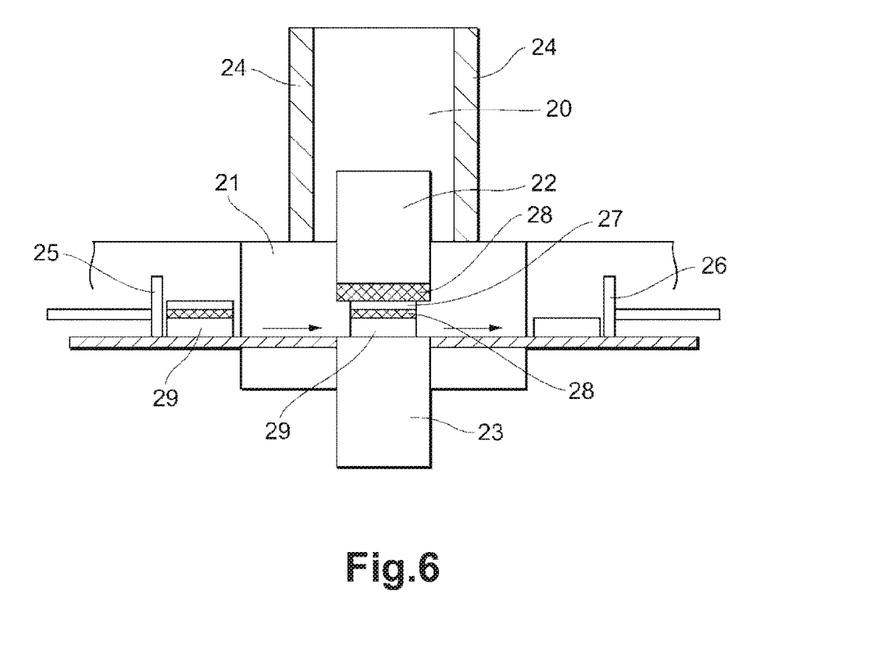
FIG. 6 is a schematic view showing the hot press firing furnace during the firing process according to one embodiment of the present invention.

The device for the hot press firing in one embodiment of the present invention is for a continuous hot press firing with a high rate, as shown in FIG. 5 and FIG. 6.

As shown in FIG. 5, the firing furnace for continuous hot press firing with a high rate in one embodiment of the present invention is provided with a heating chamber having a pressure punch 20, a pressurizing chamber 21, a punch 22, a stage 23, a heater 24, a pusher 25 and a receiving plate 26. The sample of the laminated article 27 is placed on a high-strength plate 28 which is mounted on a ceramic stand 29 and also the bottom of the punch 22.

As shown in FIG. 6, in the furnace for continuous hot press firing with a high rate in the present invention, the sintering process is performed in which the sample of the laminated article 27 is transferred to the stage 23 by the pusher 25, placed on the ceramic stand 29 and the high-strength plate 28, and then pressed and heated with the punch 22 and the high-strength plate 28 which have been heated from 1100° C. to 1300° C. in the heating chamber having a pressure punch 20. The sintered sample of the laminated article is sent to the exterior of the pressurizing chamber 21 by the receiving plate 26.

As the conditions for the firing process, for example, the temperature rising rate can be 7000° C./h or more and 100000° C./h or less, and the pressure to be added is 1.0 MPa or more and 80 MPa or less.

The atmosphere during tiring is preferably humidified $N_2$ gas (partial pressure of oxygen being $1.0 \times 10^{-7}$ to $1.0 \times 10^{-2}$ Pa). The partial pressure of oxygen should not be too low, as carbon remaining in the de-binder process will also remain in the firing process and the condition for annealing will turn to a higher temperature. In contrast, if the partial pressure of oxygen is much too high, the conductive metal will be oxidized, which is not to be selected preferably.

As the high-strength plate mentioned above, a material with a high hot shock resistance and a high bending strength can be listed such as tungsten carbide, silicon carbide, silicon nitride and the like. From the viewpoint of the reactivity with the sample, silicon carbide is preferable.

The pressure punch mentioned above can be made of a material with a high thermal conductivity such as silicon carbide, aluminum nitride and the like. From the viewpoint of the thermal resistance and the thermal conductivity, silicon carbide is preferable.

The ceramic stand mentioned above is made of a material with a low thermal conductivity such as the stabilized zirconia, alumina, silicon nitride and the like. From the viewpoint of the hot shock resistance and the thermal conductivity, the stabilized zirconia and silicon nitride are preferably used.

The holding temperature during the annealing process is preferably 650 to 1100° C., and the holding time is preferably 0.1 to 20 hours. In addition, the atmosphere during the annealing process is preferably humidified $N_2$ gas (partial pressure of oxygen being $1.0 \times 10^{-3}$ to 1.0 Pa).

In the de-binder process, the firing process and the annealing process, when the $N_2$ gas or the mixed gas is to be humidified, for example, a wetter or the like can be used.

The de-binder process, the firing process and the annealing process can be performed continuously or alone. In addition, the firing process and the annealing process can be done for several times according to the need.

Also, after the firing process and the annealing process are performed for once or more times, the paste or the glass for the dielectric layer can be coated followed by a thermal treatment so as to form the outer layer portion 4 and the side face portion 7.

The end plane of thus obtained element main body 10 is polished by barrel-polishing or sand blasting, and the paste for the external electrode is printed or transferred. Then, a firing process is performed to form the external electrode 6. Thereafter, a coating layer is formed on the outer plane of the external electrode 6 by plating or the like if needed.

The thus prepared laminated ceramic electronic component in the present invention can be mounted on a printed substrate or the like by welding or the like and then used in various electronic equipments and the like.

In addition, the present invention is not limited to the embodiments mentioned above, and various changes can be made within the scope of the present invention.

For example, a laminated ceramic capacitor is listed as the laminated ceramic electronic component of the present invention in the embodiment above. However, the laminated ceramic electronic component of the present invention is not limited to the laminated ceramic capacitor and can be, for example, a laminated varistor, a laminated thermistor or the like.

EXAMPLES

The present invention will be described below based on detailed examples, but the present invention is not limited to these examples.

In the present example, a laminated ceramic electronic component was prepared to have a dielectric layer 2 with a composition of $(Ba_{0.96}Ca_{0.04})(Ti_{0.94}Zr_{0.06})O_3+MgO$ (0.1 parts by mass)+MnO (0.3 parts by mass)+$Y_2O_3$ (0.4 parts by mass)+$SiO_2$ (0.3 parts by mass)+$V_2O_5$ (0.05 parts by mass).

First of all, powders of $BaTiO_3$, $CaTiO_3$, $BaZrO_3$, $MgCO_3$, $MnCO_3$, $Y_2O_3$, and $SiO_2$ having a particle size of 0.1 to 1 μm were subjected to a wet mixing for 16 hours by a ball mill. The mixture was dried to prepare a dielectric powder.

Then, 100 parts by mass of the dielectric ceramic starting material, 10 parts by mass of polyvinyl butyral, 5 parts by mass of dioctyl phthalate (DOP) used as a plasticizer, and 100 parts by mass of propanol used as the solvent were mixed by a ball mill to be a paste. In this way, the paste for dielectric layer was obtained.

Next, relative to 100 parts by mass of Ni particles with an average particle size of 0.10 μm, 40 parts by mass of an organic vehicle (a mixture obtained by dissolving 8 parts by mass of ethyl cellulose and 40 parts by mass of mineral spirit in 52 parts by mass of dihydroterpineol) was mixed to be a paste by a three-roll mill, and thus a paste for the internal electrode layer was provided.

The obtained paste for the dielectric ceramic layer was used to form a sheet by the doctor blade method on a PET film and then dried to form a green sheet. After the paste for internal electrode was printed on the green sheet, the sheet was peeled off the PET film. Thereafter, the green sheets (242 pieces) where the pattern layer of the internal electrode layer had been printed were laminated and bonded with the green sheets for the outer layer portion (without the paste for internal electrode layer printed) so that a green laminated article was obtained.

Then, several obtained green laminated article were suitably cut by using a dicing saw and arranged in a line with a side face portion 7 disposed on the same plane. The paste for dielectric layer was coated by the doctor blade method. The other side face portion 7 was similarly coated. In this case, a green chip was prepared.

Thereafter, a de-binder process was performed.
The de-binder process was done with the conditions as follows.
Temperature rising rate: 50° C./hour
Holding temperature: 750° C.
Holding time: 2 hours
Temperature dropping rate: 200° C./hour
Atmosphere: $6.0 \times 10^{-17}$ Pa The chip from which the binder had been removed was clamped with the high-strength plates 28 and then fired by using a hot press firing device to provide a sintered chip.

The chip laminate after the de-binder process was fired on the high-strength plate 28 using the hot press flung device as shown in FIG. 5 with the following conditions.
Temperature rising rate: 25000° C./hour
Holding temperature: 1100° C.
Holding time: 0.2 hours
Temperature dropping rate: 2000° C./hour
Pressure to be applied: 10 MPa
Atmosphere: $2.0 \times 10^{-5}$ Pa As the materials in the hot press tiring device mentioned above, in the present example, silicon carbide was used for the punch 22 and silicon nitride was used for the ceramic stand 29.

The sintered laminate was annealed using a non-pressurization batch furnace in the following conditions.
Temperature rising and dropping rate: 200° C./hour
Holding temperature: 900° C.
Holding time: 1 hour
Atmosphere: $2.0 \times 10^{-2}$ Pa In addition, the atmosphere in the de-binder process, the firing process and the annealing process was the mixed atmosphere of $H_2$ and humidified $N_2$.

After the annealing process, the end plane of the sintered chip was polished by barrel-polishing, and a paste for Cu terminal electrode was baked to form a terminal electrode 6. Thus, the laminated ceramic capacitor of Example 1 was formed.

The obtained laminated ceramic capacitor had a size of 0.6 mm×0.3 mm×0.22 mm, wherein the terminal electrode portion was excluded in the size determination.

<Assessment on thickness of dielectric>

The obtained laminated ceramic capacitor was cut in a plane parallel to the plane formed with the terminal electrode. The cross-section was divided into several parts and observed by a scanning electron microscope (SEM) with 5000-fold enlarged (25 μm in length×20 mμin width for one visual field area). In the measurement of the thickness distribution of the dielectric layer 2 in the width direction, the thickness of the dielectric was measured at 300 points randomly selected in each visual field and thus the average was calculated to output the thickness of the dielectric at sites with a spacing of 20 μm thereamong. The measurement results in Example 1 were shown in FIG. 7. In the measurement results of 241 dielectric layers, the average thickness at the central portion of the dielectric layers 2 was defined as and the average thickness at the end portion close to the side face portion was defined as $d_2$. In addition, the average from one end portion to the other end portion of the dielectric layer 2 was calculated and defined as $d_{AVE}$. The results were shown in Table 1.

<Assessment On Reliability>

A highly accelerated life test (HALT) was performed under a high temperature. For 30 samples, the highly accelerated life test was done at 140° C. with a voltage of 4V being applied where the mean time to failure (MTTF) and the in value used as the index of deviation were measured starting from the beginning of the test to the stage with an insulation resistance of $10^5 \Omega$. The MTTF was preferably 20 hours or more, and the m value was preferred to be 3 or more. The MTTF was further preferred to be 40 hours or more and the m value was more preferably 4 or more.

Comparative Example 1

A green sheet was similarly prepared as in Example 1 except the thickness of the green sheet was changed to 9/10 of that in Example 1. Other conditions were also similar to those in Example 1 except that a batch furnace was used in the firing process with no pressure applied.

The firing was performed with the following conditions.
Temperature rising rate: 20000° C./hour
Holding temperature: 1100° C.
Holding time: 1.0 hour
Temperature dropping rate: 1000° C./hour
Atmosphere: $2.0 \times 10^{-5}$ Pa Comparative Example 2

A laminated ceramic capacitor was similarly prepared as in Comparative Example 1 except that a side face portion 7 of the element main body 10 was formed in the laminating process of the green sheet, a pressure molding process was done in a constant pressure of 1000 kgf/cm² at 85° C., and then the thickness at the end portion of the dielectric layer 2 was made thinner than that at the central portion of the dielectric layer.

Figure 7:
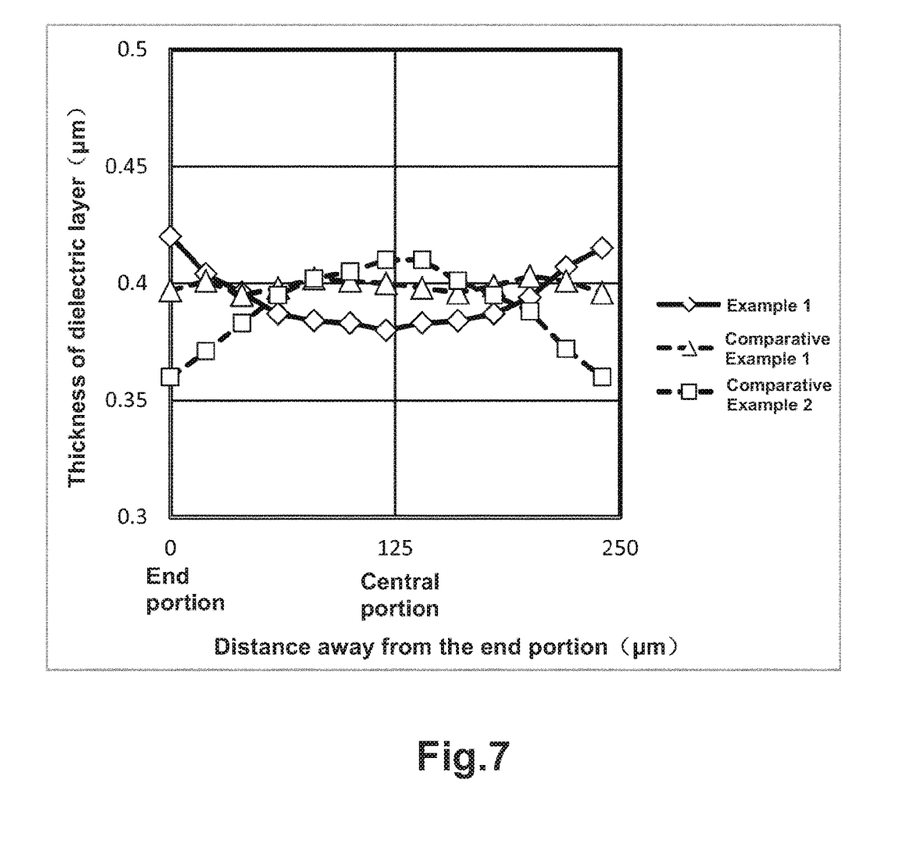
FIG. 7 is a graph showing the thickness distribution of the dielectric layer in the width direction at the cross-section as shown in FIG. 3 obtained along the II-II line in Comparative Example 1. Comparative Example 2 and Example 1 of the present invention.

The results of Example 1, Comparative Example 1 and Comparative Example 2 were shown in Table 1 and FIG. 7.

TABLE 1

| | $d_{AVE}$ (μm) | $d_1$ (μm) | $d_2$ (μm) | $d_2/d_1$ | MTTF (h) | m value |
|---|---|---|---|---|---|---|
| Example 1 | 0.39 | 0.38 | 0.42 | 1.11 | 33 | 3.5 |
| Comparative Example 1 | 0.4 | 0.4 | 0.4 | 1.00 | 15 | 1.1 |
| Comparative Example 2 | 0.39 | 0.4 | 0.36 | 0.90 | 3 | 1.3 |

It could be clearly seen from Table 1 and FIG. 7 that the reliability was good if the dielectric layer 2 was distributed to be thicker towards the side face portion. On the other hand, in Comparative Example 1, the average thickness of the dielectric layer 2 was larger than that in Example with the thickness distributed with a small deviation but the MTTF was shorter and the m value was lower.

In Comparative Example 2, the dielectric layer 2 was distributed to be thinner towards the side face portion, and the reliability further deteriorated. From this, it was known that the deterioration of the insulation strength of the dielectric layer 2 was dominantly affected by the concentration of electrical field at the end portion. Alternatively, with respect to the distribution in Example 1, as the average thickness of the dielectric layer 2 did not increase, the electrostatic capacity did not decrease so that a good reliability was obtained.

Example 2

A laminated ceramic capacitor was prepared similarly as in Example 1 except that the upper high-strength plate 28 was made of silicon carbide and the lower high-strength plate 28 was made of tungsten carbide having a lower thermal conductivity than silicon carbide in the firing process with the hot press firing device shown in FIG. 5. The plane connected to the upper plate with a high thermal conductivity became a high temperature and a temperature gradient was generated in the sample from top to bottom in the firing. Thereby, the thickness ratio of the central portion to the end portion of the dielectric was distributed in such a manner that it became larger from one outer layer side towards the other outer layer side.

Example 3

A laminated ceramic capacitor was prepared similarly as in Example 1 except that the pressure was applied with the following conditions during the firing process using the hot press firing device.

Pressure to be applied: 3 MPa at the beginning of the firing process and 10 Pa when the temperature reached 900° C. until the end of the firing process.

For the samples of Examples 1 to 3, the thickness at the central portion of dielectric layer 2 which was layer no. k from one outermost layer was defined as $d_{1-k}$ and the thickness at the end portion close to the side face portion was defined as $d_{2-k}$. The thickness ratio of the dielectric layer no. k ($d_{2-k}/d_{1-k}$) was measured every 20 layers. The measurement results about the thickness distribution were shown in FIG. 8.

TABLE 2

|  | $d_2/d_1$ | MTTF (h) | m value |
|---|---|---|---|
| Example 1 | 1.10 | 33 | 3.5 |
| Example 2 | 1.10 | 38 | 2.5 |
| Example 3 | 1.10 | 40 | 5.5 |

Figure 8:
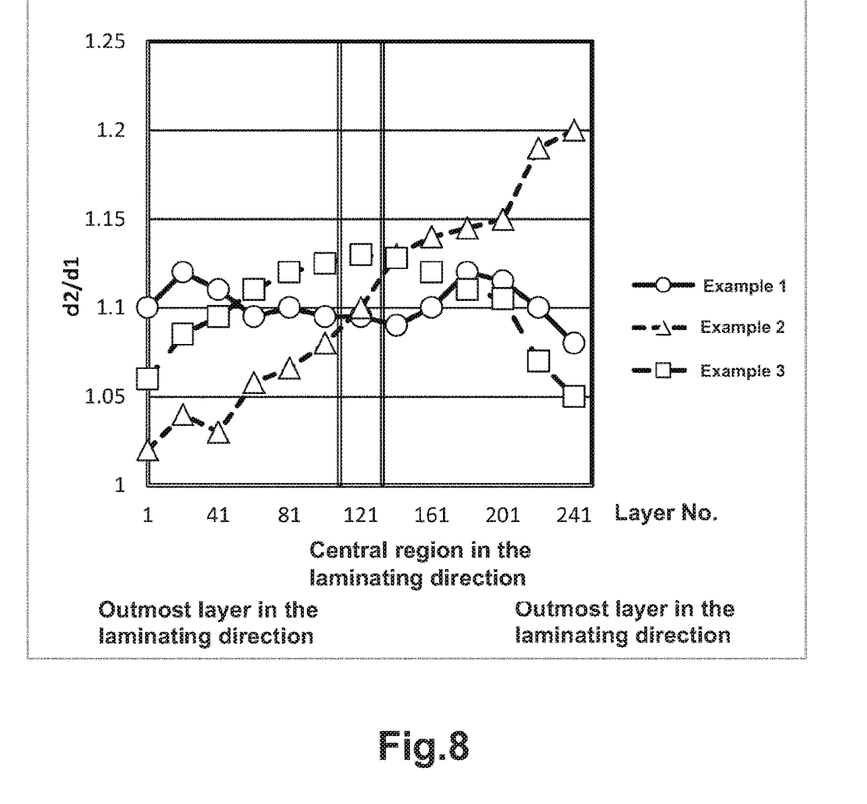
FIG. 8 is a graph showing the distribution of thickness ratio of the dielectric layer in the laminating direction at the cross-section as shown in FIG. 3 obtained along the II-II line in Example 1, Example 2 and Example 3 of the present invention.

It could be clearly seen from Table 2 and FIG. 8 that in Example 3 where the ratio of the thickness at the central portion to that at the end portion in the dielectric layer 2 was distributed to be larger from the outmost layer to the central region in the laminating direction, the m value was high and the deviation was small.

Examples 4 to 8

A laminated ceramic capacitor was prepared similarly as in Example 3 except that a pressure was applied from the holding temperature being 900° C. to the end of the firing process with the conditions shown in Table 3 during the firing process using the hot press firing device. The ratio ($d_2/d_1$) of the thickness at the central portion of the dielectric layer 2 to that at the end portion close to the side face portion was measured in the central region in the laminating direction (layer no. 109 to layer no. 133), and the results were shown in Table 3 together with the results from the reliability test.

TABLE 3

|  | Holding temperature (° C.) | Pressure to be applied (MPa) | Average of whole layer $d_2/d_1$ | Central region in laminating direction $d_2/d_1$ | MTTF (h) | m value |
|---|---|---|---|---|---|---|
| Example 4 | 1090 | 15 | 1.1 | 1.12 | 45 | 3.2 |
| Example 5 | 1080 | 20 | 1.1 | 1.15 | 55 | 5.3 |
| Example 6 | 1075 | 25 | 1.1 | 1.22 | 63 | 5.2 |
| Example 7 | 1070 | 30 | 1.1 | 1.3 | 53 | 4.4 |
| Example 8 | 1060 | 35 | 1.1 | 1.33 | 25 | 3 |

It could be clearly seen from Table 3 that Examples 4 to 7 where the ratio of $d_1$ with the thickness $d_2$ at the end portion ($d_2/d_1$) in the central region in the laminating direction was 1.15 to 1.30 had especially excellent reliability.

Examples 9 to 11

In the firing process using the hot press firing device, the pressure to be applied was slowly decreased from the beginning to the end of the process where a specific temperature was kept. The pressure to be applied from the beginning to the end of the holding process was shown in Table 4.

During the cooling process, the pressure was maintained as that at the end of the holding process.

A hot press firing was performed with the other conditions being the same as those in Example 1.

If the pressure to be applied in the hot press firing process was slowly decreased before the end of densifying the dielectric layer 2, as the internal electrode layer 3 contracted towards the central portion of the sample, a distribution was formed with the thickness of the internal electrode layer 3 became thinner from the central portion to the side face portion.

<Assessment On Thickness of Internal Electrode Layer>

With respect to the obtained laminated ceramic capacitor, all 242 internal electrode layers were measured similarly as in the assessment on the thickness of the dielectric layer by a scanning electron microscope (SEM) to calculate the average thickness $e_1$ at the central portion of the internal electrode layer 3 and the average thickness $e_2$ at the end portion close to the side face portion.

<Assessment On Thermal Shock Resistance>

The laminated ceramic capacitor was dipped in a solder bath set at 300° C. for approximately 1 second, and then the sample was observed after enlarged by 100 fold using a stereomicroscope so as to check out if there was any crack. The number of samples with cracks was counted. A total of 100 samples were used in the test. Further, if 5 or less samples with cracks were picked out from 100 samples, the reliability was deemed as sufficient in household applications.

TABLE 4

| | Pressure to be applied in holding process (MPa) | | | | | | Number of samples not good in thermal shock test |
|---|---|---|---|---|---|---|---|
| | Beginning of holding process | End of holding process | $d_2/d_1$ | $e_1$ | $e_2$ | $e_2/e_1$ | |
| Comparative Example 1 | 10 | 10 | 1 | 0.36 | 0.36 | 1.00 | 40 |
| Example 1 | 10 | 10 | 1.11 | 0.33 | 0.35 | 1.06 | 5 |
| Example 9 | 12 | 9 | 1.11 | 0.34 | 0.33 | 0.98 | 4 |
| Example 10 | 12 | 8 | 1.1 | 0.34 | 0.32 | 0.94 | 0 |
| Example 11 | 12 | 6 | 1.1 | 0.35 | 0.31 | 0.89 | 0 |

Based on Table 4, it was clearly seen that the thermal shock resistance was improved if the thickness of the internal electrode layer 3 was decreased from the central portion to the side face portion.

Examples 12 to 14

During the firing process using a hot press firing device, the pressure to be applied was slowly decreased from the end of the holding process to 800° C. A laminated ceramic capacitor was similarly prepared as in Example 11 except that a pressure was applied at 800° C. as shown in Table 5. The average thickness $d_1$ at the central portion of the dielectric layer 2 and the average thickness $d_2$ at the end portion were measured as the measurement results of 241 dielectric layers, and the average thickness $e_1$ at the central portion of the internal electrode layer 3 and the average thickness $e_2$ at the end portion were measured as the measurement results of 242 internal electrode layers. Then, $(d_2+e_2)/(d_1+e_1)$ was calculated. In the thermal shock test, the number of times to dip the sample in a solder bath was increased to 3 times so as to provide a more severe thermal shock. The results from Examples 11 to 14 were shown in Table 5.

TABLE 5

| | Pressure to be applied in cooling process (MPa) | | | Number of samples not good in thermal shock test |
|---|---|---|---|---|
| | Beginning of cooling process | 800° C. | $(d_2 + e_2)/(d_1 + e_1)$ | |
| Example 11 | 6 | 6 | 1.01 | 4 |
| Example 12 | 6 | 4 | 0.99 | 0 |
| Example 13 | 6 | 2 | 0.91 | 0 |
| Example 14 | 6 | 0.5 | 0.89 | 2 |

It could he clearly seen from Table 5 that the thermal shock resistance was further improved if the following relationship was met, i.e., $0.9 \leq (d_2+e_2)/(d_1+e_1) \leq 1.0$.

The present invention can provide a laminated ceramic electronic component with an excellent reliability and an excellent thermal shock resistance. In addition, the present invention is not limited to the laminated ceramic capacitor, and also can be applicable to other surface-mounting electronic component such as a varistor, a thermistor, a LC composite component and the like.

DESCRIPTION OF REFERENCE NUMERALS

1 Laminated ceramic electronic component
2 Dielectric layer
3 Internal electrode layer
4 Outer layer portion
5 End portion
6 External electrode
7 Side face portion
10 Element main body
10a First main face
10b Second main face
10c First side face
10d Second side face
10e First end face
10f Second end face
20 Heating chamber having a pressure punch
21 Pressurizing chamber
22 Punch
23 Stage
24 Heater
25 Pusher
26 Receiving plate
27 Sample of laminated article
28 High-strength plate
29 Ceramic stand

What is claimed is:

1. A laminated ceramic electronic component comprising:
a cuboid-shaped element main body having a first main face and a second main face elongating along the length direction and the width direction, a first side face and a second side face elongating along the length direction and the height direction, and a first end face and a second end face elongating along the width direction and the height direction; and
a pair of internal electrode layers opposite to each other in the height direction inside the element main body with a dielectric layer interposed therebetween in such a manner that they are exposed on the first end face or the second end face,
wherein a thickness of the dielectric layer becomes larger from a central portion to the first side face and the second side face, and a thickness of the internal electrode layer becomes smaller from the central portion towards the first side face and the second side face,
the thickness of the dielectric layer at the central portion is defined as $d_1$, the thickness of the dielectric layer at an end portion close to the first side face or the second side face is defined as $d_2$, and a ratio $d_2/d_1$ of $d_2$ to $d_1$ gets larger from an outmost layer towards a central region in a laminating direction, and
in the central region in the laminating direction, the ratio $d_2/d_1$ is 1.15 to 1.30.

2. The laminated ceramic electronic component of claim 1, wherein when the thickness of the dielectric layer at the central portion is defined as $d_1$, the thickness of the dielectric layer at an end portion close to the first side face or the second side face is defined as $d_2$, the thickness of the internal electrode layer at the central portion is defined as $e_1$, and the thickness of the internal electrode layer at the end portion close to the first side face or the second side face is defined as $e_2$, a relationship of $0.9 \leq (d_2+e_2)/(d_1+e_1) \leq 1.0$ is satisfied.

3. A laminated ceramic electronic component comprising:
a cuboid-shaped element main body having a first main face and a second main face elongating along the length direction and the width direction, a first side face and a second side face elongating along the length direction and the height direction, and a first end face and a second end face elongating along the width direction and the height direction; and
a pair of internal electrode layers opposite to each other in the height direction inside the element main body with a dielectric layer interposed therebetween in such a manner that they are exposed on the first end face or the second end face,
wherein a thickness of the dielectric layer becomes larger from a central portion to the first side face and the second side face, the thickness of the dielectric layer at the central portion is defined as $d_1$, the thickness of the dielectric layer at an end portion close to the first side face or the second side face is defined as $d_2$, and a ratio $d_2/d_1$ of $d_2$ to $d_1$ gets larger from an outmost layer towards a central region in a laminating direction.

4. The laminated ceramic electronic component of claim 3, wherein in the central region in the laminating direction, the ratio $d_2/d_1$ is 1.15 to 1.30.

5. The laminated ceramic electronic component of claim 3, wherein a thickness of the internal electrode layer becomes smaller from the central portion towards the first side face and the second side face.

6. The laminated ceramic electronic component of claim 3, wherein when the thickness of the internal electrode layer at the central portion is defined as $e_1$, and the thickness of the internal electrode layer at the end portion close to the first side face or the second side face is defined as $e_2$, a relationship of $0.9 \leq (d_2+e_2)/(d_1+e_1) \leq 1.0$ is satisfied.

* * * * *